US012811449B2

(12) United States Patent
Geng et al.

(10) Patent No.: US 12,811,449 B2
(45) Date of Patent: Nov. 24, 2026

(54) MOTOR ROTOR, MOTOR, AND ELECTRIC VEHICLE

(71) Applicants: Huawei Digital Power Technologies Co., Ltd., Shenzhen (CN); Nanjing University of Science and Technology, Nanjing (CN)

(72) Inventors: Weiwei Geng, Nanjing (CN); Chaoqiang Wu, Shenzhen (CN); Jinhua Chen, Dongguan (CN); Zhao Zhou, Dongguan (CN)

(73) Assignees: Huawei Digital Power Technologies Co., Ltd., Shenzhen (CN); Nanjing University of Science and Technology, Nanjing (CN)

( * ) Notice: Subject to any disclaimer, the term of this patent is extended or adjusted under 35 U.S.C. 154(b) by 363 days.

(21) Appl. No.: 18/477,314

(22) Filed: Sep. 28, 2023

(65) Prior Publication Data

US 2024/0039350 A1 Feb. 1, 2024

Related U.S. Application Data

(63) Continuation of application No. PCT/CN2021/084116, filed on Mar. 30, 2021.

(51) Int. Cl.
*H02K 1/2795* (2022.01)
*B60K 1/00* (2006.01)
(Continued)

(52) U.S. Cl.
CPC ............. *H02K 1/2795* (2022.01); *B60K 1/00* (2013.01); *H02K 21/24* (2013.01); *B60L 50/60* (2019.02); *B60L 2200/10* (2013.01); *B64D 27/24* (2013.01)

(58) Field of Classification Search
CPC .. H02K 1/2798; H02K 1/2795; H02K 1/2796; H02K 1/2793; H02K 21/24
See application file for complete search history.

(56) References Cited

U.S. PATENT DOCUMENTS

2013/0088112 A1* 4/2013 Cho .................... H02K 1/2798 310/156.37
2017/0244293 A1* 8/2017 Kanda ...................... H02K 1/02
(Continued)

FOREIGN PATENT DOCUMENTS

CN 102624115 A * 8/2012
CN 103915921 A * 7/2014
(Continued)

OTHER PUBLICATIONS

CN102624115A translation (Year: 2012).*
(Continued)

*Primary Examiner* — Oluseye Iwarere
*Assistant Examiner* — Nicholas Lee Setzer
(74) *Attorney, Agent, or Firm* — Leydig, Voit & Mayer, Ltd.

(57) ABSTRACT

A motor rotor, a motor, and an electric vehicle are disclosed. The motor rotor includes an iron core yoke, a spoke plate, and at least two permanent magnets. The at least two permanent magnets are fastened to the iron core yoke and sequentially spaced apart in the circumferential direction. The spoke plate is located between adjacent permanent magnets. A quadrature-axis magnetic circuit is reserved between adjacent permanent magnets, and the spoke plate whose reluctance is less than that of air or the permanent magnet material is disposed on the quadrature-axis magnetic circuit, that is, the spoke plate is disposed between the adjacent permanent magnets. In this way, reluctance of the quadrature-axis magnetic circuit may be reduced, and quadrature-axis inductance may be increased. Accordingly, a reluctance torque is increased, and a torque output capability of the motor is improved.

13 Claims, 8 Drawing Sheets

(51) Int. Cl.

| | |
|---|---|
| ***H02K 21/24*** | (2006.01) |
| *B60L 50/60* | (2019.01) |
| *B64D 27/24* | (2006.01) |

(56) References Cited

U.S. PATENT DOCUMENTS

| | | | | |
|---|---|---|---|---|
| 2018/0323679 | A1* | 11/2018 | Woolmer | H02K 1/182 |
| 2021/0152041 | A1* | 5/2021 | Duan | H02K 1/2753 |
| 2023/0006490 | A1* | 1/2023 | Yan | H02K 21/24 |
| 2024/0128814 | A1* | 4/2024 | Hou | H02K 1/27 |

FOREIGN PATENT DOCUMENTS

| | | | | | |
|---|---|---|---|---|---|
| CN | 102624115 | B | | 5/2015 | |
| CN | 105305748 | A | | 2/2016 | |
| CN | 111355323 | A | * | 6/2020 | H02K 1/28 |
| CN | 111541325 | A | | 8/2020 | |
| FR | 2606951 | B1 | | 4/1994 | |
| JP | 2011130529 | A | * | 6/2011 | |
| WO | 2021026575 | A1 | | 2/2021 | |

OTHER PUBLICATIONS

CN103915921A translation (Year: 2014).*
CN111355323A translation (Year: 2020).*
JP2011130529A translation (Year: 2011).*

* cited by examiner

MOTOR ROTOR, MOTOR, AND ELECTRIC VEHICLE

CROSS-REFERENCE TO RELATED APPLICATIONS

This application is a continuation of International Application No. PCT/CN2021/084116, filed on Mar. 30, 2021, the disclosure of which is hereby incorporated by reference in its entirety.

TECHNICAL FIELD

This application relates to the field of motor technologies, and in particular, to a motor rotor, a motor, and an electric vehicle.

BACKGROUND

An axial flux motor, also referred to as a disk permanent magnet motor, features a large air gap plane, a compact structure, a high torque density, a high power density, a small size, a low weight, and the like, and therefore is widely used in mechanical engineering such as electric vehicles and aircraft propulsion systems.

The axial flux motor includes a stator and a motor rotor. Generally, the stator is a coil, and the motor rotor is a permanent magnet or a disk with a permanent magnet. At present, the rotor of the axial flux motor has a low reluctance torque, and therefore a torque output capability of the motor is poor, which leads to inadequate power of the axial flux motor, a large quantity of required permanent magnets, and high costs.

Therefore, how to increase a reluctance torque of the motor rotor to improve a torque output capability of a motor should be a research and development direction in the industry.

SUMMARY

This application provides a motor rotor, a motor, and an electric vehicle. According to this application, a reluctance torque of the motor rotor may be increased to improve a torque output capability of the motor.

According to a first aspect, this application provides a motor rotor, including an iron core yoke, a spoke plate, and at least two permanent magnets. The iron core yoke is in a disk shape. The iron core yoke includes an axial direction and a circumferential direction. The at least two permanent magnets are fastened to the iron core yoke and sequentially spaced apart in the circumferential direction. The spoke plate is located between adjacent permanent magnets. Reluctance of the spoke plate is less than that of air, or reluctance of the spoke plate is less than that of a permanent magnet material. It may be understood that the spoke plate may form an integrated structure with the iron core yoke, so that a mounting process is reduced, and the structure is simple. In addition, the integrated structure makes the motor rotor high in structural strength and stability. Alternatively, the spoke plate may form a split structure with the iron core yoke, and the spoke plate is fastened to the iron core yoke through bonding or the like. The spoke plate may be made of a same material as the iron core yoke or another different material with low reluctance. This is not limited in this application. For example, both the iron core yoke and the spoke plate may be made of a soft magnetic material. The permanent magnet material includes an aluminum-nickel-cobalt permanent magnet alloy, an iron-chromium-cobalt permanent magnet alloy, a permanent magnet ferrite, a rare earth permanent magnet material, a composite permanent magnet material, and the like. Reluctance of different permanent magnet materials is different. In this application, that the reluctance of the spoke plate is less than that of the permanent magnet material means that the reluctance of the spoke plate is less than that of a permanent magnet material with minimum reluctance.

According to this application, a quadrature-axis magnetic circuit is reserved between adjacent permanent magnets, and the spoke plate whose reluctance is less than that of air or the permanent magnet material is disposed on the quadrature-axis magnetic circuit, that is, the spoke plate is disposed between the adjacent permanent magnets. In this way, reluctance of the quadrature-axis magnetic circuit may be reduced, and quadrature-axis inductance may be increased. Therefore, a reluctance torque is increased, and a torque output capability of a motor is improved. Specifically, the motor is mainly configured to output a torque. If the torque is excessively low, power is inadequate, and the motor cannot drive a to-be-driven object. The reluctance torque is a type of torque. Increasing utilization of the reluctance torque may improve the overall torque output capability of the motor. The reluctance torque is related to the quadrature-axis inductance and direct-axis inductance. A larger difference between the quadrature-axis inductance and the direct-axis inductance indicates more significant saliency effect of the motor and the greater reluctance torque. If there is no spoke plate, there may be air or a permanent magnet magnetized in another direction between two adjacent permanent magnets (the permanent magnet magnetized in the another direction is the permanent magnet material). The reluctance of air and the permanent magnet material is high, and therefore the quadrature-axis inductance is low, the difference between the quadrature-axis inductance and the direct-axis inductance is small, and the reluctance torque is low, which is not conducive to improving the torque output capability of the motor. According to this application, the spoke plate with low reluctance is disposed between adjacent permanent magnets (that is, on the quadrature-axis magnetic circuit), so that the quadrature-axis inductance may be increased, that is, the difference between the quadrature-axis inductance and the direct-axis inductance is increased. Therefore, the reluctance torque may be effectively increased, and the torque output capability of the motor may be improved. The torque of the motor includes the reluctance torque and a permanent magnet torque. It may be understood that when a required torque of the motor is constant, increasing the reluctance torque may correspondingly reduce the permanent magnet torque. In this way, a quantity of permanent magnets may be reduced, which is conducive to reduction of manufacturing costs of the motor. The motor rotor in this application has a simple structure and a more flexible design, and can better meet diversified performance requirements on the motor in different application scenarios.

In a possible implementation, a size of the spoke plate in the axial direction is greater than a size of the spoke plate in the circumferential direction. A direct-axis magnetic circuit partially passes through the spoke plate in the circumferential direction. Therefore, the spoke plate can also increase the direct-axis inductance. The size of the spoke plate in the axial direction is limited to be greater than the size of the spoke plate in the circumferential direction, so that an increase of the quadrature-axis inductance may be greater than that of the direct-axis inductance. In this way, the difference between the quadrature-axis inductance and the direct-axis inductance can be increased, to increase the reluctance torque and improve the torque output capability of the motor.

In a possible implementation, there are at least two spoke plates between two adjacent permanent magnets, and the at least two spoke plates are spaced apart in the circumferential direction. There is air or the permanent magnet material between adjacent spoke plates. As a quantity of spoke plates increases, an amount of air or a quantity of permanent magnet materials also increases. An increase of the quantity of permanent magnet materials may enhance flux concentration effects and increase the torque of the motor. In addition, an increase of the amount of air or the quantity of permanent magnet materials can reduce the direct-axis inductance and increase the difference between the quadrature-axis inductance and the direct-axis inductance, to increase the reluctance torque and improve the torque output capability of the motor.

In a possible implementation, the motor rotor further includes a first permanent magnet. The first permanent magnet is located between the permanent magnet and the spoke plate. The reluctance of the spoke plate is less than that of the first permanent magnet. In this implementation, the permanent magnet is magnetized in the axial direction, and two adjacent permanent magnets are magnetized in opposite directions. The first permanent magnet is magnetized in the circumferential direction, and at least two first permanent magnets between two adjacent permanent magnets are magnetized in a same direction. A combination of the permanent magnet and the first permanent magnet that are magnetized in different directions may effectively improve flux concentration effects of the motor rotor, improve an air gap density, and reduce eddy current losses of the permanent magnet and the first permanent magnet. If there is no spoke plate, there may be the first permanent magnet between two adjacent permanent magnets. Reluctance of the first permanent magnet is high, and therefore the quadrature-axis inductance is low, the difference between the quadrature-axis inductance and the direct-axis inductance is small, and the reluctance torque is low, which is not conducive to improving the torque output capability of the motor. In this implementation, the spoke plate whose reluctance is less than that of the first permanent magnet is disposed between two adjacent permanent magnets, and the first permanent magnet is located between the permanent magnet and the spoke plate. In this way, the quadrature-axis inductance may be effectively increased, and the utilization of the reluctance torque of the motor may be increased.

In a possible implementation, the permanent magnet is of a sector structure, and an inner circular arc and an outer circular arc of the permanent magnet of the sector structure form a concentric structure (that is, have a same circle center) with an iron core. A first straight line segment and a second straight line segment of the permanent magnet of the sector structure may be parallel to a radial direction of the iron core. Alternatively, there is an included angle between a first straight line segment and a radial direction of the iron core and between a second straight line segment and the radial direction of the iron core. This helps reduce torque ripples and improve vibration noise of the motor. The permanent magnet is evenly embedded in an accommodating cavity reserved in the iron core. The permanent magnet is magnetized in the axial direction, and two adjacent permanent magnets are magnetized in opposite directions. It should be noted that a structure of the permanent magnet is not limited to a sector, and the permanent magnet may also be in another shape, which may be set according to a requirement. The first permanent magnet may be sector-shaped or rectangular. The first permanent magnet is evenly embedded in a space reserved in the iron core, that is, the first permanent magnet is embedded in a space between an iron core pole piece and the spoke plate of the iron core. The first permanent magnet is magnetized in the circumferential direction. First permanent magnets on two sides of the spoke plate are magnetized in a same direction. Magnetic fields of the permanent magnet and the first permanent magnet both gather towards the iron core pole piece adjacent to the permanent magnet and the first permanent magnet.

In a possible implementation, the spoke plate includes a limiting surface. The limiting surface is in contact with the first permanent magnet, so that the spoke plate and the first permanent magnet are fastened in the axial direction. The first permanent magnet is located between the permanent magnet and the spoke plate. If there is no limiting surface, the first permanent magnet moves in the axial direction, which is unfavorable for structural stability of the motor rotor.

In a possible implementation, the spoke plate includes a main portion and a limiting portion. The main portion is connected to the iron core yoke. The limiting portion is on a side that is of the main portion and that is away from the iron core yoke. The limiting surface is located at the limiting portion. In other words, a size of the limiting portion is greater than that of the main portion. The main portion and the limiting portion form a step structure. The limiting surface is a step surface of the step structure. The first permanent magnet is located between the permanent magnet and the spoke plate. In this implementation, the limiting surface is disposed on the spoke plate, to limit the first permanent magnet in the axial direction, so that the first permanent magnet is more stable and cannot move in the axial direction. Therefore, overall stability of the motor is improved.

In a possible implementation, the spoke plate includes a first end and a second end that are disposed opposite to each other. The first end is connected to the iron core yoke. A size of the spoke plate gradually increases from the first end to the second end. The limiting surface is a connection surface between the first end and the second end. In other words, the spoke plate of the iron core may be of an inverted trapezoidal structure. The spoke plate may be in contact with the permanent magnet. Alternatively, the spoke plate may be spaced apart from the permanent magnet. When the spoke plate is spaced apart from the permanent magnet, there may be air or another structural part (for example, the first permanent magnet) between the spoke plate and the permanent magnet. The size of the spoke plate is limited to gradually increase from the first end to the second end, so that a size of an end that is of a space formed between the permanent magnet and the spoke plate of the iron core and that is close to the iron core yoke is large, while a size of an end that is away from the iron core yoke is small. In this way, when the first permanent magnet is disposed between the permanent magnet and the spoke plate, the connection surface (that is, the limiting surface) between the first end and the second end may limit, in the axial direction, the first permanent magnet disposed between the permanent magnet and the spoke plate, so that the first permanent magnet disposed between the permanent magnet and the spoke plate is more stable and cannot move in the axial direction. Therefore, the overall stability of the motor is improved. It may be understood that when the spoke plate of the iron core is of the inverted trapezoidal structure with a wide upper portion and a narrow lower portion, a space between the spoke plate of the iron core and the iron core pole piece may be of a trapezoidal structure with a narrow upper portion and a wide lower portion, that is, the first permanent magnet embedded between the spoke plate of the iron core and the iron core pole piece may be of a trapezoidal structure.

In a possible implementation, the spoke plate includes a first end and a second end that are disposed opposite to each other, and a connection portion located between the first end and the second end. The first end is connected to the iron core yoke. A size from the first end to the connection portion gradually decreases. A size from the second end to the connection portion gradually decreases. The limiting surface is a connection surface between the second end and the connection portion. In other words, the spoke plate may be of a dumbbell-shaped structure with two large ends and a small middle portion. When the spoke plate is spaced apart from the permanent magnet, there may be air or another structural part (for example, the first permanent magnet) between the spoke plate and the permanent magnet. The spoke plate is limited as the dumbbell-shaped structure with the two large ends and the small middle portion, so that a size of an end that is of a space formed between the permanent magnet and the spoke plate of the iron core and that is away from the iron core yoke is small. In this way, when the first permanent magnet is disposed between the permanent magnet and the spoke plate, the connection surface (that is, the limiting surface) between the second end and the connection portion may limit the first permanent magnet in the axial direction, so that the first permanent magnet disposed between the permanent magnet and the spoke plate is more stable and cannot move in the axial direction. Therefore, the overall stability of the motor is improved. It may be understood that when the spoke plate of the iron core is of the dumbbell-shaped structure with the two large ends and the small middle portion, a space between the spoke plate of the iron core and the iron core pole piece may be of a structure with two small ends and a large middle portion, that is, the first permanent magnet embedded between the spoke plate of the iron core and the iron core pole piece may be of a structure with two small ends and a large middle portion.

In a possible implementation, the motor rotor further includes an iron core pole piece and a joint portion. The iron core pole piece is located on a side that is of the permanent magnet and that is away from the iron core yoke. The joint portion is connected to the iron core pole piece and the spoke plate. The first permanent magnet is located between the joint portion and the iron core yoke. That is, the joint portion blocks an opening between the iron core pole piece and the spoke plate. The iron core pole piece and the spoke plate are on left and right sides of the first permanent magnet respectively. The joint portion is on an upper side of the first permanent magnet, while the iron core yoke is on a lower side. The iron core pole piece and the spoke plate limit the first permanent magnet in the circumferential direction, so that the first permanent magnet cannot move in the circumferential direction. The joint portion limits the first permanent magnet in the axial direction, so that the first permanent magnet is more stable and cannot move in the axial direction. Therefore, the overall stability of the motor is improved.

In a possible implementation, the at least two permanent magnets are stacked in the axial direction. As the quantity of permanent magnets in the axial direction increases, the direct-axis inductance may be reduced, and the difference between the quadrature-axis inductance and the direct-axis inductance may be increased, so that the reluctance torque is increased, and the torque output capability of the motor is improved.

In a possible implementation, the motor rotor includes an elastic connecting piece, and the elastic connecting piece is connected to at least two first permanent magnets. The at least two first permanent magnets are connected as a whole by using the elastic connecting piece. The elastic connecting piece is scalable, so that the at least two first permanent magnets may be mounted at the same time. Therefore, mounting efficiency may be improved, and a mounting process may be simplified.

In a possible implementation, the motor rotor further includes a first permanent magnet. The first permanent magnet includes a first magnetic portion, a second magnetic portion, and a third magnetic portion that are sequentially connected. The spoke plate includes a first end and a second end that are disposed opposite to each other, and a first side portion and a second side portion that are located between the first end and the second end. The first end is connected to the iron core yoke. The second magnetic portion is located at the second end. The first magnetic portion is located at the first side portion. The third magnetic portion is located at the second side portion. It may be understood that in this implementation, the first permanent magnet is of a U-shaped structure. The first permanent magnet of the U-shaped structure is fastened to the spoke plate upside down. In this way, permanent magnet structures (the first magnetic portion and the third magnetic portion) on two sides of the spoke plate are connected as a whole, and simplicity in mounting and positioning accuracy are ensured.

In a possible implementation, the motor rotor further includes a first permanent magnet. The first permanent magnet includes a first magnetic portion, a second magnetic portion, and a third magnetic portion that are sequentially connected. The spoke plate includes a first end and a second end that are disposed opposite to each other, and a first side portion and a second side portion that are located between the first end and the second end. The iron core yoke, the first end, and the second end are sequentially arranged in the axial direction. The second magnetic portion is located between the first end and the iron core yoke. The first magnetic portion is located at the first side portion. The third magnetic portion is located at the second side portion. It may be understood that in this implementation, the first permanent magnet is of a U-shaped structure, and the spoke plate is located in the first permanent magnet of the U-shaped structure. The spoke plate can limit the first permanent magnet in the axial direction, to prevent structural instability of the motor rotor caused by a movement of the first permanent magnet in the axial direction.

In a possible implementation, the motor rotor further includes a first permanent magnet. The first permanent magnet includes a first magnetic portion, a second magnetic portion, and a third magnetic portion that are sequentially connected. The spoke plate includes a first plate and a second plate. The first plate and the second plate are disposed at an interval in the axial direction. The first plate is connected to the iron core yoke. The second magnetic portion is located between the first plate and the second plate. The first magnetic portion and the third magnetic portion are located on two opposite sides of the spoke plate. It may be understood that in this implementation, the first permanent magnet is of an H-shaped structure, and the second magnetic portion of the first permanent magnet of the H-shaped structure is located between the first plate and the second plate. The second plate can limit the first permanent magnet in the axial direction, to prevent structural instability of the motor rotor caused by a movement of the first permanent magnet in the axial direction.

In a possible implementation, the motor rotor further includes an iron core pole piece and a flux barrier. The iron core pole piece and the iron core yoke are disposed at an interval. The flux barrier is connected to the iron core pole piece and the iron core yoke. The iron core pole piece, the flux barrier, and the iron core yoke enclose an accommodating cavity. The permanent magnet is located in the accommodating cavity. Specifically, a quantity of iron core pole pieces is the same as the quantity of permanent magnets. The iron core pole pieces are sequentially spaced apart in the circumferential direction of the iron core yoke. The iron core pole piece and the iron core yoke are disposed at an interval in the axial direction. Two flux barriers are located on lower sides of two opposite ends of the iron core pole piece. The flux barriers are connected to the iron core pole piece and the iron core yoke, so that the iron core pole piece, the flux barriers, and the iron core yoke enclose an accommodating cavity. In this implementation, the accommodating cavity is provided, so that mounting precision of the permanent magnet may be improved, mounting positioning of the permanent magnet may be implemented, and an assembly process is simplified. During mounting, the permanent magnet only needs to be mounted in the accommodating cavity with a matching size, so that the mounting precision and mounting efficiency are improved, and simplicity in assembly and fastening is ensured. It may be understood that the iron core pole piece, the flux barrier, and the iron core yoke may form a split structure, and the iron core pole piece and the flux barrier are fastened to the iron core yoke through bonding or the like. Alternatively, the iron core pole piece and the flux barrier may form an integrated structure with the iron core yoke, so that a mounting process is reduced, and the structure is simple. In addition, the integrated structure makes the motor rotor high in structural strength and stability. The iron core pole piece may generate quadrature-axis inductance, to increase the difference between the quadrature-axis inductance and the direct-axis inductance, so that the reluctance torque may be effectively increased, and the torque output capability of the motor may be improved. The iron core pole piece is on a surface of the permanent magnet. The iron core pole piece has a low eddy current coefficient, and is close to an air gap, so that the eddy current loss of the permanent magnet may be reduced. The iron core pole piece is a part of a magnetic circuit. If no iron core pole piece is disposed, there may be air where the iron core pole piece is currently located. The reluctance of air is high, and therefore the torque of the motor is significantly reduced, which is not conducive to improving the torque output capability of the motor.

In this implementation, the permanent magnet is disposed between the iron core yoke and the iron core pole piece to form a motor rotor of a built-in structure. The motor rotor of the built-in structure achieves significant saliency effect of the motor, and has an advantage of generating a high reluctance torque. Specifically, disposing the permanent magnet inside may add the quadrature-axis magnetic circuit, improve the saliency effect of the motor, endow the motor with high flux weakening performance and a wide constant power range, reduce the eddy current loss of the permanent magnet, and protect the permanent magnet to make the permanent magnet unlikely to be demagnetized. The permanent magnet in the motor rotor is mounted in the accommodating cavity, so that a structure of the motor rotor is solid, and structural instability of the motor rotor may be avoided even when the permanent magnet is subjected to centrifugal force and magnetic pull force. In addition, disposing the permanent magnet inside may fully utilize the reluctance torque generated by asymmetry of a magnetic circuit of the motor rotor, to improve the torque output capability of the motor without increasing the quantity of permanent magnets.

Alternatively, a quantity of iron core pole pieces and the quantity of permanent magnets may be two, three, four, five, six, seven, eight, nine, ten, or the like, which may be set based on a structure, a size, and required performance of the motor. This is not limited in this application.

In a possible implementation, a size of the spoke plate in the axial direction is greater than a distance between a surface that is of the iron core pole piece and that is away from the permanent magnet and the iron core yoke. In this implementation, the size of the spoke plate in the axial direction is limited to be greater than the distance between the surface that is of the iron core pole piece and that is away from the permanent magnet and the iron core yoke, so that the size of the spoke plate in the axial direction is enlarged. Therefore, the reluctance of the quadrature-axis magnetic circuit may be reduced, the quadrature-axis inductance may be increased, and utilization of the reluctance torque may be increased.

According to a second aspect, this application provides a motor, including a stator, a rotating shaft, and the motor rotor according to any one of the foregoing implementations. The motor rotor is mounted to the rotating shaft. The stator is mounted to the rotating shaft. Specifically, the stator and two motor rotors are coaxially connected by using the rotating shaft. There may be one motor rotor, and the one motor rotor and the stator form a single-stator single-rotor motor. In another implementation, there may be two motor rotors, and the stator is located between the two motor rotors to form a single-stator double-rotor motor. The two rotors in the single-stator double-rotor motor are symmetrically arranged. Permanent magnets are magnetized in opposite directions. The stator may have an iron core yoke, may have no yoke, or may have no iron core. The motor in this application may be an axial flux motor. The axial flux motor features a large air gap plane, a compact structure, a high torque density, a high power density, a small size, a low weight, and the like, and therefore is widely used in mechanical engineering such as electric vehicles and aircraft propulsion systems.

According to a third aspect, this application provides an electric vehicle, including a transmission shaft, wheels, and the motor according to the second aspect. The transmission shaft is connected to the motor and the wheels. The motor outputs a torque. Mechanical energy of the motor is transmitted to the wheels through the transmission shaft, to drive the wheels to rotate. The motor converts electric energy of a battery into the mechanical energy, and drives the wheels and a working apparatus through a transmission apparatus, or directly drives the wheels and a working apparatus. The motor is configured to output the mechanical energy. The mechanical energy of the motor is transmitted to the wheels through the transmission shaft, to drive the wheels to rotate.

According to this application, the quadrature-axis magnetic circuit is reserved between adjacent permanent magnets, and the spoke plate whose reluctance is less than that of air or the permanent magnet material is disposed on the quadrature-axis magnetic circuit, that is, the spoke plate is disposed between the adjacent permanent magnets. In this way, the reluctance of the quadrature-axis magnetic circuit may be reduced, and the quadrature-axis inductance may be increased. Therefore, the reluctance torque is increased, and the torque output capability of the motor is improved. The torque of the motor includes the reluctance torque and the permanent magnet torque. It may be understood that when the required torque of the motor is constant, increasing the reluctance torque may correspondingly reduce the permanent magnet torque. In this way, the quantity of permanent magnets may be reduced, which is conducive to reduction of the manufacturing costs. According to this application, the permanent magnet may be disposed between the iron core yoke and the iron core pole piece to form the motor rotor of the built-in structure. The motor rotor of the built-in structure achieves significant saliency effect of the motor, and has an advantage of generating a high reluctance torque. In addition, disposing the permanent magnet inside may fully utilize the reluctance torque generated by asymmetry of the magnetic circuit of the motor rotor, to improve the torque output capability of the motor without increasing the quantity of permanent magnets.

BRIEF DESCRIPTION OF DRAWINGS

The following describes the accompanying drawings used in embodiments of this application.

DESCRIPTION OF EMBODIMENTS

The following clearly describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

Orientation terms mentioned in embodiments of this application, for example, "up", "down", "left", "right", "inside", and "outside", are merely directions with reference to the accompanying drawings. Therefore, the orientation terms are used to better and more clearly describe and understand embodiments of this application, instead of indicating or implying that an apparatus or element needs to have a specific orientation and be constructed and operated in a specific orientation, and cannot be understood as limitations on embodiments of this application.

Figure 1:
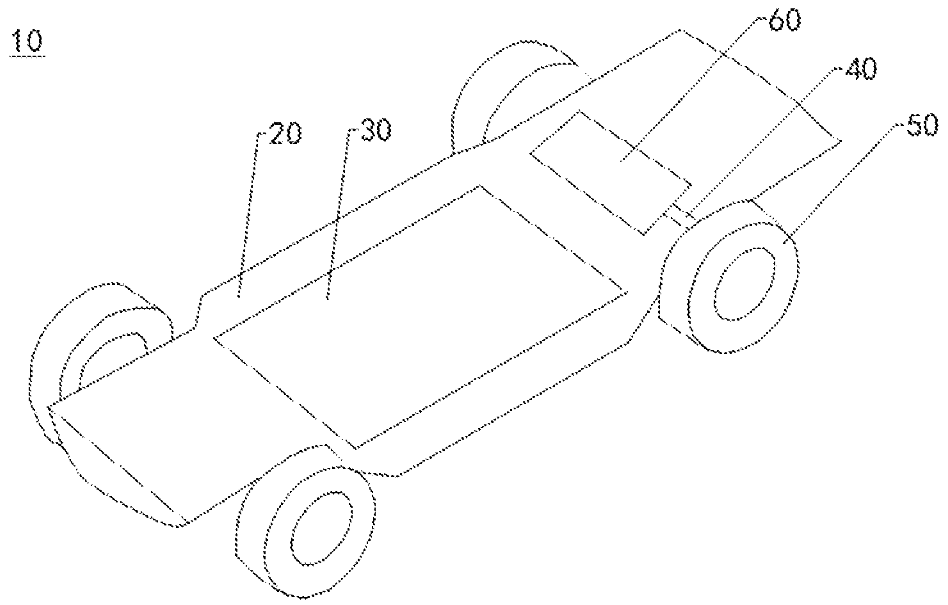
FIG. 1 is a schematic diagram of a structure of an electric vehicle according to an embodiment of this application.

This application provides a motor rotor, a motor, and an electric vehicle. FIG. 1 is a schematic diagram of a structure of an electric vehicle 10. The electric vehicle 10 includes a chassis 20, a battery 30, a transmission shaft 40, wheels 50, and a motor 60. The electric vehicle 10 is a vehicle that is driven by a vehicle-mounted power supply (the vehicle-mounted power supply may be the battery 30) and that drives the wheels by using the motor 60, has advantages such as no pollution, reproducibility, low noise, high energy efficiency, diversity, simple structure, and convenience in maintenance, and is a development direction of vehicles in the future. Specifically, the battery 30 provides electric energy for the motor 60 of the electric vehicle 10. The motor 60 converts the electric energy of the battery 30 into mechanical energy, and drives the wheels 50 and a working apparatus through a transmission apparatus, or directly drives the wheels 50 and a working apparatus. The electric vehicle 10 is driven by electricity. Therefore, the motor 60 and the battery 30 become key factors that affect power performance, endurance, safety, and reliability of the electric vehicle 10. The battery 30 and the motor 60 are located on the chassis 20. The battery 30 provides the electric energy for the motor 60. The motor 60 converts the electric energy of the battery 30 into the mechanical energy. The transmission shaft 40 is connected to the motor 60 and the wheels 50. The motor 60 outputs the mechanical energy. The mechanical energy of the motor 60 is transmitted to the wheels 50 through the transmission shaft 40, to drive the wheels 50 to rotate.

The motor 60 in this application may be an axial flux motor. The axial flux motor features a large air gap plane, a compact structure, a high torque density, a high power density, a small size, a low weight, and the like, and therefore is widely used in mechanical engineering such as electric vehicles and aircraft propulsion systems. Alternatively, the motor 60 may be another type of motor. This is not limited in this application.

Figure 2:
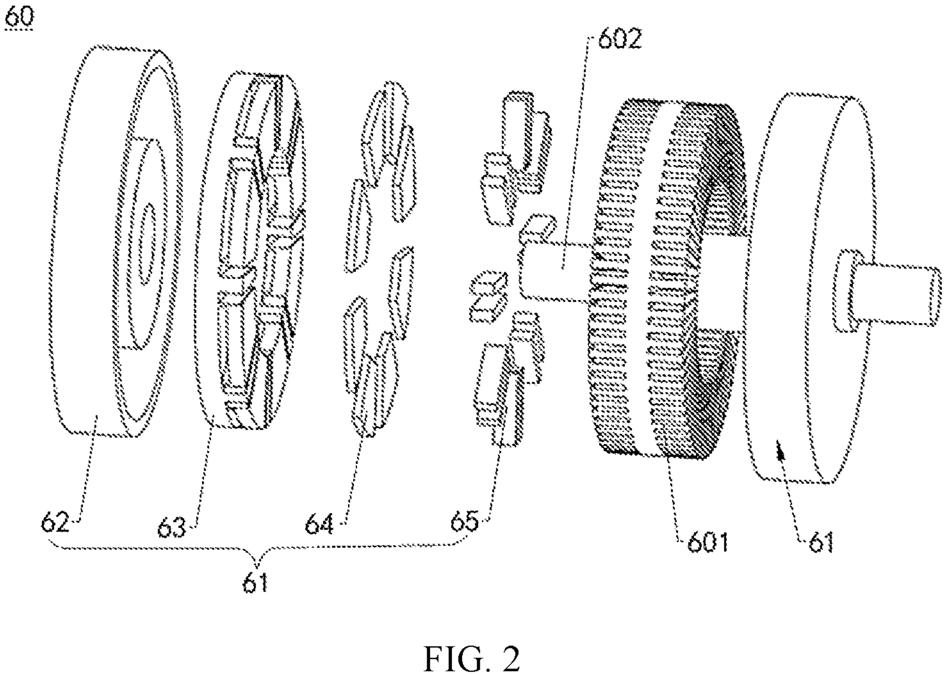
FIG. 2 is a schematic diagram of a structure of a motor according to an embodiment of this application.

FIG. 2 is a schematic diagram of a structure of the motor 60. The motor 60 includes a stator 601, a rotating shaft 602, and motor rotors 61. The stator 601 is coaxially connected to the motor rotor 61. There may be two motor rotors 61, and the stator 601 is located between the two motor rotors 61 to form a single-stator double-rotor motor 60. The motor rotor 61 is mounted to the rotating shaft 602. The stator 601 is mounted to the rotating shaft 602. That is, the stator 601 is coaxially connected to the two motor rotors 61 by using the rotating shaft 602. Air gaps are formed between the stator 601 and the two motor rotors 61. The two rotors in the single-stator double-rotor motor 60 are arranged in mirror symmetry. Permanent magnets are magnetized in opposite directions. The stator 601 may have an iron core yoke, may have no yoke, or may have no iron core.

In another implementation, there may be one motor rotor 61, and the one motor rotor 61 and the stator 601 form a single-stator single-rotor motor 60.

It should be noted that there are two motor rotors 61 in FIG. 2. The motor rotor 61 on a right side of the stator 601 and the motor rotor 61 on a left side are of a same structure and in mirror symmetry. The motor rotor 61 on the right side of the stator 601 may be considered as a structure after assembly of the motor rotor 61 on the left side is completed. In other words, the motor rotor 61 on the right side has been assembled, and the motor rotor 61 on the left side has not been assembled, only to reflect a structure before assembly.

In this case, an embodiment of this application provides a motor rotor 61. The motor rotor 61 in this application has a large reluctance torque, so that a torque output capability of the motor 60 may be effectively improved. In addition, the motor rotor 61 in this embodiment of this application is simple in structure, low in mounting difficulty, and high in mounting precision.

Figure 3:
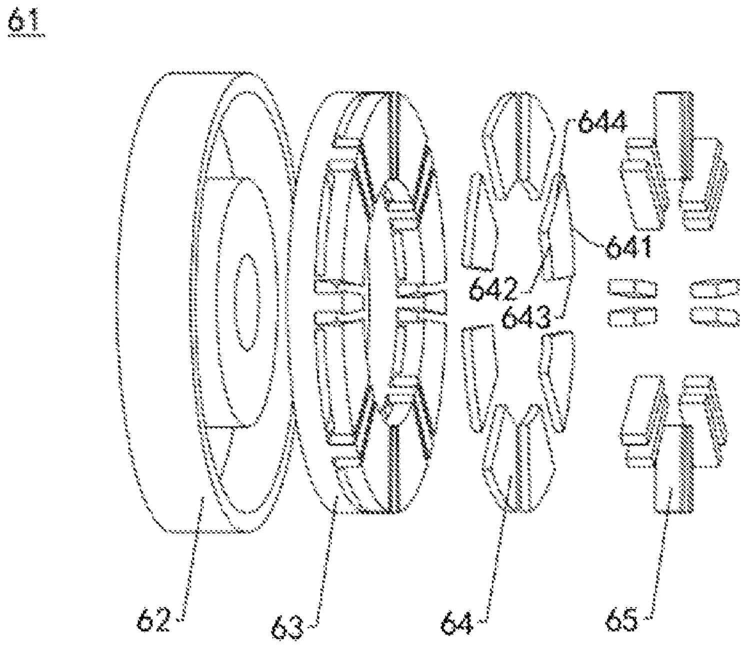
FIG. 3 is an exploded view of a motor rotor according to an embodiment of this application.

FIG. 3 is an exploded view of the motor rotor 61. The motor rotor 61 includes a housing 62, an iron core 63, at least two permanent magnets 64, and first permanent magnets 65. The at least two permanent magnets 64 and the first permanent magnets 65 are mounted to the iron core 63. The iron core 63 is mounted in the housing 62, and is fastened in the housing 62 through adhesion, injection molding, or the like. The housing 62 may protect the iron core 63, the permanent magnet 64, and the first permanent magnet 65, to prevent impact on performance of the motor rotor 61 due to damage to the iron core 63, the permanent magnet 64, and the first permanent magnet 65 during transportation, mounting, and operation. It may be understood that the housing 62 can enhance structural strength of the motor rotor 61, and reduce impact of centrifugal force on the structure of the motor rotor 61 when the motor rotor 61 rotates at a high speed.

Figure 4:
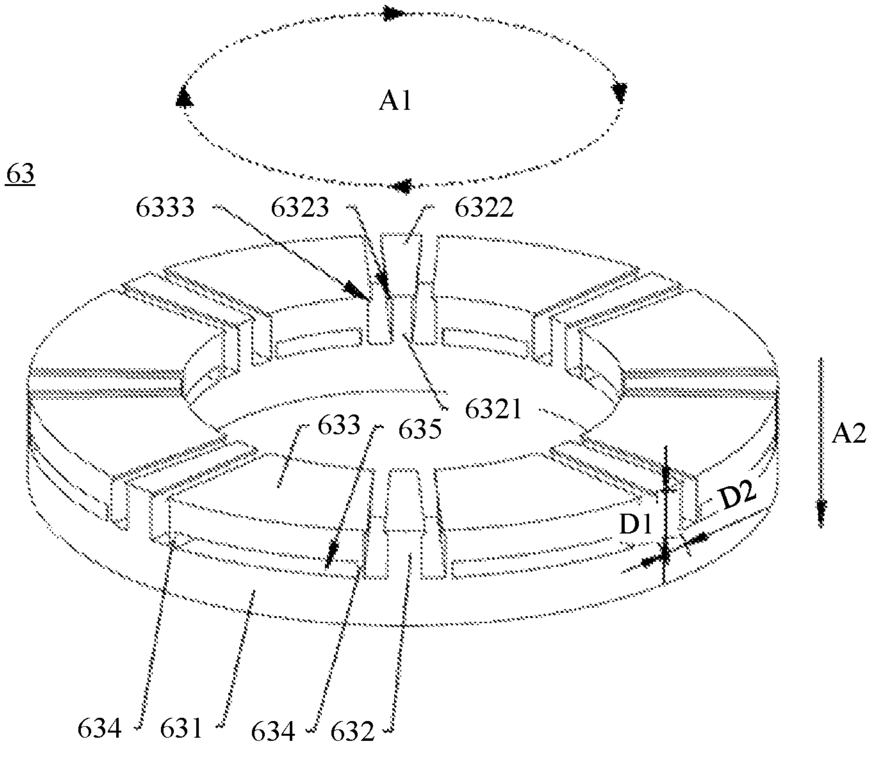
FIG. 4 is a schematic diagram of a structure of an iron core of a motor rotor according to an embodiment of this application.
Figure 5:
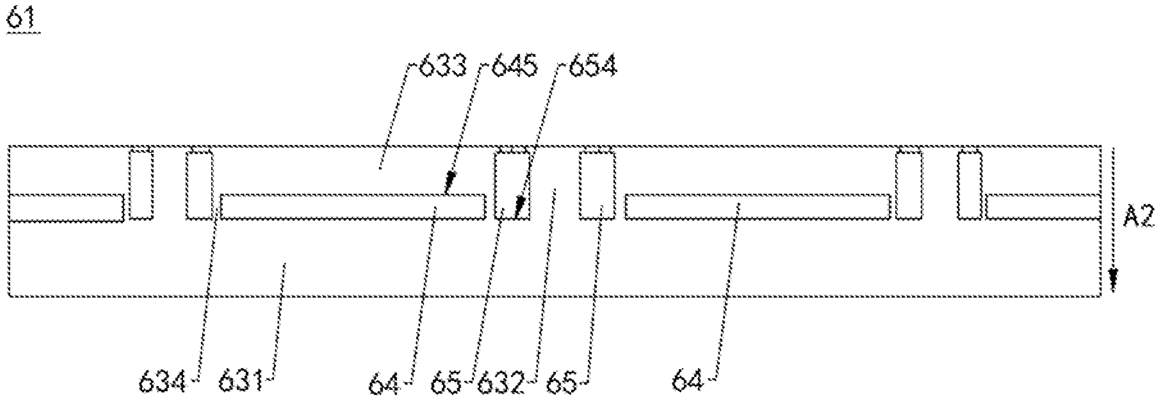
FIG. 5 is a schematic diagram of a planar structure of a motor rotor according to an embodiment of this application.

As shown in FIG. 4 and FIG. 5, FIG. 4 is a schematic diagram of a structure of the iron core 63 of the motor rotor 61, and FIG. 5 is a schematic diagram of a planar structure of the motor rotor 61. The iron core 63 includes an iron core yoke 631, spoke plates 632, and iron core pole pieces 633. The iron core yoke 631 is in a disk shape, and has a center hole in the disk shape. The iron core yoke 631 includes a circumferential direction A1 and an axial direction A2. The at least two permanent magnets 64 are fastened to the iron core yoke 631 and sequentially spaced apart in the circumferential direction A1. The spoke plate 632 is located between adjacent permanent magnets 64. In other words, the permanent magnet 64 is also located between two adjacent spoke plates 632. A quadrature-axis magnetic circuit is reserved between two adjacent permanent magnets 64, that is, the spoke plate 632 is located on the quadrature-axis magnetic circuit.

The spoke plate 632 may form a split structure with the iron core yoke 631, and the spoke plate 632 is fastened to the iron core yoke 631 through bonding or the like. Alternatively, the spoke plate 632 may form an integrated structure with the iron core yoke 631, so that a mounting process is reduced, and the structure is simple. In addition, the integrated structure endows the iron core 63 with advantages of high structural strength and stability. The spoke plate 632 may be made of a same material as the iron core yoke 631 or another different material with low reluctance. For example, both the iron core yoke 631 and the spoke plate 632 may be made of a soft magnetic material. Specifically, reluctance of the spoke plate 632 is less than that of air, or reluctance of the spoke plate 632 is less than that of a permanent magnet material. If no spoke plate 632 is disposed, there is usually the permanent magnet material or air between adjacent permanent magnets 64. In this application, the spoke plate 632 whose reluctance is less than that of air or the permanent magnet material is disposed between adjacent permanent magnets 64. Both the permanent magnet 64 and the first permanent magnet 65 are permanent magnet materials. The permanent magnet material includes an aluminum-nickel-cobalt permanent magnet alloy, an iron-chromium-cobalt permanent magnet alloy, a permanent magnet ferrite, a rare earth permanent magnet material, a composite permanent magnet material, and the like. Reluctance of different permanent magnet materials is different. In this application, that the reluctance of the spoke plate 632 is less than that of the permanent magnet material means that the reluctance of the spoke plate 632 is less than that of a permanent magnet material with minimum reluctance.

According to this application, a quadrature-axis magnetic circuit is reserved between adjacent permanent magnets 64, and the spoke plate 632 whose reluctance is less than that of air or the permanent magnet material is disposed on the quadrature-axis magnetic circuit, that is, the spoke plate 632 is disposed between the adjacent permanent magnets 64. In this way, reluctance of the quadrature-axis magnetic circuit may be reduced, and quadrature-axis inductance may be increased. Therefore, a reluctance torque is increased, and a torque output capability of the motor 60 is improved. Specifically, the motor 60 is mainly configured to output a torque. If the torque is excessively low, power is inadequate, and the motor cannot drive a to-be-driven object. The reluctance torque is a type of torque. Increasing utilization of the reluctance torque may improve the overall torque output capability of the motor 60. The reluctance torque is related to the quadrature-axis inductance and direct-axis inductance. A larger difference between the quadrature-axis inductance and the direct-axis inductance indicates more significant saliency effect of the motor 60 and the greater reluctance torque. If there is no spoke plate 632, there may be air or a permanent magnet magnetized in another direction between two adjacent permanent magnets 64 (the permanent magnet magnetized in the another direction is the permanent magnet material). The reluctance of air and the permanent magnet material is high, and therefore the quadrature-axis inductance is low, the difference between the quadrature-axis inductance and the direct-axis inductance is small, and the reluctance torque is low, which is not conducive to improving the torque output capability of the motor 60. According to this application, the spoke plate 632 with low reluctance is disposed between adjacent permanent magnets 64 (that is, on the quadrature-axis magnetic circuit), so that the quadrature-axis inductance of the quadrature-axis magnetic circuit may be increased, that is, the difference between the quadrature-axis inductance and the direct-axis inductance is increased. Therefore, the reluctance torque may be effectively increased, and the torque output capability of the motor 60 may be improved. The torque of the motor includes the reluctance torque and a permanent magnet torque. It may be understood that when a required torque of the motor is constant, increasing the reluctance torque may correspondingly reduce the permanent magnet torque. In this way, a quantity of permanent magnets 64 may be reduced, which is conducive to reduction of manufacturing costs. The motor rotor 61 in this application has a simple structure, a more flexible design, and many controllable parameters, and can better meet diversified performance requirements on the motor in different application scenarios.

It should be noted that in this application, no iron core pole piece 633 is disposed, the permanent magnets 64 are disposed at intervals only on the iron core yoke 631, and the spoke plate 632 is disposed between adjacent permanent magnets 64. In this case, the spoke plate 632 can also reduce reluctance of the quadrature-axis magnetic circuit and increase the quadrature-axis inductance. In this application, no first permanent magnet 65 is disposed, and the permanent magnet 64 and the spoke plate 632 are disposed at an interval, that is, there is air between the permanent magnet 64 and the spoke plate 632. In this case, the spoke plate 632 can also reduce reluctance of the quadrature-axis magnetic circuit and increase the quadrature-axis inductance. Alternatively, no first permanent magnet 65 is disposed, and the permanent magnet 64 is in contact with the spoke plate 632. In addition, in this application, the iron core pole piece 633 and the first permanent magnet 65 may be disposed to enhance performance of the motor rotor 61. This embodiment is described by using an example in which the motor rotor 61 is provided with the iron core pole piece 633 and the first permanent magnet 65.

A quantity of iron core pole pieces 633 is the same as the quantity of permanent magnets 64. The iron core pole pieces 633 are sequentially spaced apart in the circumferential direction A1 of the iron core yoke 631. The iron core pole piece 633 and the iron core yoke 631 are disposed at an interval in the axial direction A2. Two flux barriers 634 are disposed between the iron core pole piece 633 and the iron core yoke 631. The two flux barriers 634 are located on lower sides of two opposite ends of the iron core pole piece 633. The flux barriers 634 are connected to the iron core pole piece 633 and the iron core yoke 631, so that the iron core pole piece 633, the flux barriers 634, and the iron core yoke 631 enclose an accommodating cavity 635. The permanent magnet 64 is mounted in the accommodating cavity 635. In this implementation, the accommodating cavity 635 is provided, so that mounting precision of the permanent magnet 64 may be improved, mounting positioning of the permanent magnet 64 may be implemented, and an assembly process is simplified. During mounting, the permanent magnet 64 only needs to be mounted in the accommodating cavity 635 with a matching size, so that the mounting precision and mounting efficiency are improved, and simplicity in assembly and fastening is ensured. In this implementation, reinforcing ribs may be disposed on a surface that is of the flux barrier 634 and that faces the spoke plate 632622 and a surface that is of the iron core pole piece and that faces the spoke plate 632, to enhance overall structural strength of the iron core 63.

It should be noted that in this implementation, no flux barrier 634 is disposed, and the iron core pole piece 633 is separated from the iron core yoke 631. The permanent magnet 64 is first fastened to the iron core yoke 631, and then the iron core pole piece 633 is fastened to the permanent magnet 64.

The iron core pole piece 633, the flux barrier 634, and the iron core yoke 631 may form a split structure, and the iron core pole piece 633 and the flux barrier 634 are fastened to the iron core yoke 631 through bonding or the like. Alternatively, the iron core pole piece 633 and the flux barrier 634 may form an integrated structure with the iron core yoke 631, so that a mounting process is reduced, and the structure is simple. In addition, the integrated structure makes the iron core 63 high in structural strength and stability.

The iron core pole piece 633 may generate quadrature-axis inductance, to increase the difference between the quadrature-axis inductance and the direct-axis inductance, so that the reluctance torque may be effectively increased, and the torque output capability of the motor 60 may be improved. The iron core pole piece 633 is on a surface of the permanent magnet 64. The iron core pole piece 633 has a low eddy current coefficient, and the iron core pole piece 633 is close to an air gap, so that an eddy current loss of the permanent magnet 64 may be reduced. The iron core pole piece 633 is a part of a magnetic circuit. If no iron core pole piece 633 is disposed, there may be air where the iron core pole piece 633 is currently located. The reluctance of air is high, and therefore the torque of the motor 60 is significantly reduced, which is not conducive to improving the torque output capability of the motor 60.

The permanent magnet 64 on the motor rotor 61 may be arranged in a surface-mounted or built-in manner. The motor rotor 61 of a surface-mounted structure is simple in structure, convenient to mount, small, and light. However, it is difficult to fasten the permanent magnet 64 of the surface-mounted structure. During operation of the motor rotor 61, when the permanent magnet 64 of the surface-mounted structure is subjected to centrifugal force and magnetic pull force, the structure of the motor rotor 61 is unstable. In addition, the motor rotor 61 of the surface-mounted structure has disadvantages such as an incapability of utilizing the reluctance torque, a large quantity of required permanent magnets 64, and a large surface eddy current of the permanent magnet 64. Therefore, in this implementation, the permanent magnet 64 may be disposed between the iron core yoke 631 and the iron core pole piece 633 to form a motor rotor 61 of a built-in structure. The motor rotor 61 of the built-in structure achieves significant saliency effect of the motor, and has an advantage of generating a high reluctance torque. Specifically, disposing the permanent magnet 64 inside may add the quadrature-axis magnetic circuit, improve the saliency effect of the motor 60, endow the motor 60 with high flux weakening performance and a wide constant power range, reduce the eddy current loss of the permanent magnet 64, and protect the permanent magnet 64 to make the permanent magnet 64 unlikely to be demagnetized. The permanent magnet 64 in the motor rotor 61 is mounted in the accommodating cavity 635, so that a structure of the motor rotor 61 is solid, and structural instability of the motor rotor 61 may be avoided even when the permanent magnet 64 is subjected to the centrifugal force and the magnetic pull force. In addition, disposing the permanent magnet 64 inside may fully utilize the reluctance torque generated by asymmetry of a magnetic circuit of the motor rotor 61, to improve the torque output capability of the motor 60 without increasing the quantity of permanent magnets 64.

It should be noted that FIG. 4 merely shows that the quantity of iron core pole pieces 633 and the quantity of permanent magnets 64 (that is, accommodating cavities 635) are eight. In another implementation, the quantity of iron core pole pieces 633 and the quantity of permanent magnets 64 (the permanent magnets 64 are located in accommodating cavities 635) may be two, three, four, five, six, seven, nine, ten, or the like, which may be set based on a structure, a size, and required performance of the motor 60. This is not limited in this application.

Refer to FIG. 5. The first permanent magnet 65 is located between the permanent magnet 64 and the spoke plate 632. The reluctance of the spoke plate 632 is less than that of the first permanent magnet 65. It may be understood that the first permanent magnet 65 is the permanent magnet material. When the iron core pole piece 633 is disposed, the first permanent magnet 65 is also located between the iron core pole piece 633 and the spoke plate 632. If there is no spoke plate 632, there may be a complete first permanent magnet 65 between two adjacent permanent magnets 64, or there is no first permanent magnet 65 but air between two adjacent permanent magnets 64. The reluctance of air and the first permanent magnet 65 is high, and therefore the quadrature-axis inductance is low, the difference between the quadrature-axis inductance and the direct-axis inductance is small, and the reluctance torque is low, which is not conducive to improving the torque output capability of the motor 60. In this implementation, the spoke plate 632 whose reluctance is less than that of the first permanent magnet 65 is disposed between two adjacent permanent magnets 64, and the first permanent magnet 65 is located between the permanent magnet 64 and the spoke plate 632. In this way, the quadrature-axis inductance may be effectively increased, and utilization of the reluctance torque of the motor 60 may be improved.

In an exemplary implementation, refer to FIG. 3. The permanent magnet 64 may be of a sector structure. An inner circular arc 641 and an outer circular arc 642 of the permanent magnet 64 of the sector structure form a concentric structure (that is, have a same circle center) with the iron core 63. A first straight line segment 643 and a second straight line segment 644 of the permanent magnet 64 of the sector structure may be parallel to a radial direction of the iron core 63. Alternatively, there is an included angle between a first straight line segment 643 and a radial direction of the iron core 63 and between a second straight line segment 644 and the radial direction of the iron core 63. This helps reduce torque ripples and improve vibration noise of the motor 60. The permanent magnet 64 is evenly embedded in the accommodating cavity 635 reserved in the iron core 63. The permanent magnet 64 is magnetized in the axial direction A2, and two adjacent permanent magnets 64 are magnetized in opposite directions. It should be noted that a structure of the permanent magnet 64 is not limited to a sector, and the permanent magnet 64 may also be in another shape, which may be set according to a requirement.

In an exemplary implementation, refer to FIG. 3. The first permanent magnet 65 may be sector-shaped or rectangular. The first permanent magnet 65 is evenly embedded in a space reserved in the iron core 63, that is, the first permanent magnet 65 is embedded in a space between the iron core pole piece 633 and the spoke plate 632 of the iron core. The first permanent magnet 65 is magnetized in the circumferential direction A1. First permanent magnets 65 on two sides of the spoke plate 632 are magnetized in a same direction. Magnetic fields of the permanent magnet 64 and the first permanent magnet 65 both gather towards the iron core pole piece 633 adjacent to the permanent magnet 64 and the first permanent magnet 65.

The permanent magnet 64 may be fastened in the accommodating cavity 635 through adhesion or injection molding, and the first permanent magnet 65 may also be fastened between the iron core pole piece 633 and the spoke plate 632 through adhesion, injection molding, or injection molding, to enhance bonding strength between the permanent magnet 64 and the iron core 63 and between the first permanent magnet 65 and the iron core 63, improve structural strength of the motor rotor 61, and enhance structural stability of the motor 60.

In this implementation, a combination of the permanent magnet 64 and the first permanent magnet 65 that are magnetized in different directions is used. The permanent magnet 64 is magnetized in the axial direction A2, and two adjacent permanent magnets 64 are magnetized in opposite directions. The first permanent magnet 65 is magnetized in the circumferential direction A1, and at least two first permanent magnets 65 between two adjacent permanent magnets 64 are magnetized in a same direction. A combination of different magnetization directions may effectively improve flux concentration effects of the motor rotor 61, improve an air gap density, and reduce eddy current losses of the permanent magnet 64 and the first permanent magnet 65.

Refer to FIG. 5. The structure shown in FIG. 5 is used as an example. In the axial direction A2, a top surface 645 that is of the permanent magnet 64 and that is away from the iron core yoke 631 is higher than a bottom surface 654 that is of the first permanent magnet 65 and that faces the iron core yoke 631. In this way, magnetic leakage is avoided when the top surface 645 that is of the permanent magnet 64 and that is away from the iron core yoke 631 is less than or equal to the bottom surface 654 that is of the first permanent magnet 65 and that faces the iron core yoke 631.

Figure 6:
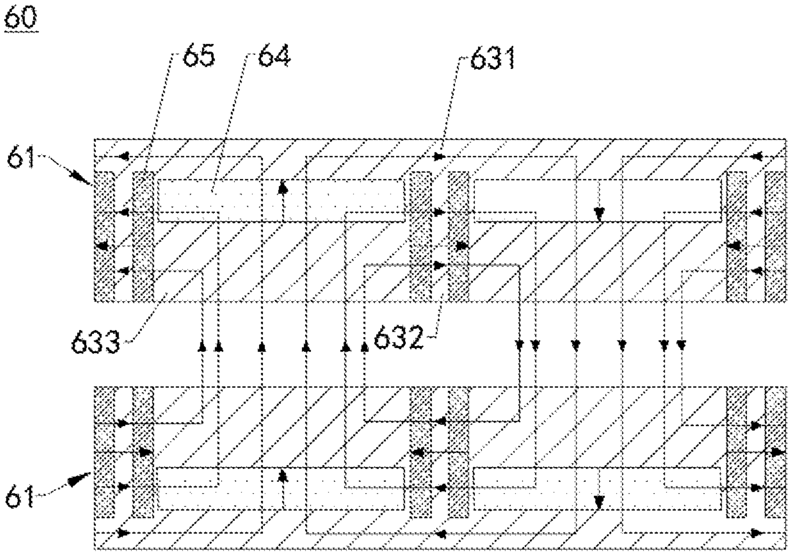
FIG. 6 is a schematic diagram of a direct-axis magnetic circuit of a motor according to an embodiment of this application.
Figure 7:
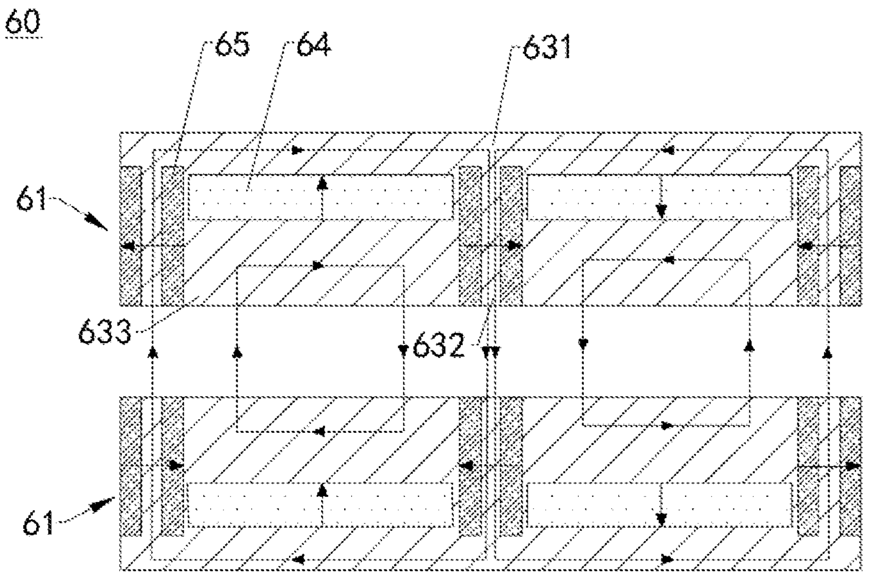
FIG. 7 is a schematic diagram of a quadrature-axis magnetic circuit of a motor according to an embodiment of this application.

Refer to FIG. 6 and FIG. 7. FIG. 6 is a schematic diagram of a direct-axis magnetic circuit of the motor 60. FIG. 7 is a schematic diagram of a quadrature-axis magnetic circuit of the motor 60. The direct-axis magnetic circuit passes through the permanent magnet 64 and the first permanent magnet 65. The quadrature-axis magnetic circuit does not pass through the permanent magnet 64 and the first permanent magnet 65. The reluctance of the permanent magnet 64 and the first permanent magnet 65 is high, and therefore the direct-axis inductance is low. The reluctance of the spoke plate 632 is low (which may also be understood as that overall reluctance of the iron core 63 is low), so that the quadrature-axis inductance of the quadrature-axis magnetic circuit that passes through the spoke plate 632 is high. In this way, the quadrature-axis inductance is much higher than the direct-axis inductance, that is, the difference between the quadrature-axis inductance and the direct-axis inductance is large, the saliency effect of the motor 60 is significant, and the reluctance torque is increased, which is conducive to improving the torque output capability of the motor 60. The direct-axis magnetic circuit and the quadrature-axis magnetic circuit form a complete magnetic loop through the iron core 63 and the permanent magnet 64 of the motor rotor 61, and a stator core (not shown in the figure), to increase a main flux and reduce magnetic leakage. In this way, flux concentration is implemented to help improve an air gap flux density.

It may be seen from FIG. 6 and FIG. 7 that both magnetic induction lines of the permanent magnet 64 and the first permanent magnet 65 that are in contact with a same iron core pole piece 633 get close to the iron core pole piece 633 or get away from the iron core pole piece 633. In this application, a combination of the permanent magnet 64 and the first permanent magnet 65 may effectively improve the flux concentration effects of the motor rotor 61, improve an air gap density, increase the torque output capability of the motor, and reduce the eddy current losses of the permanent magnet 64 and the first permanent magnet 65.

With reference to FIG. 4, FIG. 6, and FIG. 7, a size D1 of the spoke plate 632 in the axial direction A2 is greater than a size D2 of the spoke plate 632 in the circumferential direction A1. The direct-axis magnetic circuit partially passes through the spoke plate 632 in the circumferential direction A1. Therefore, the spoke plate 632 can also increase the direct-axis inductance. The size of the spoke plate 632 in the axial direction A2 is limited to be greater than the size of the spoke plate 632 in the circumferential direction A1, so that an increase of the quadrature-axis inductance may be greater than that of the direct-axis inductance. In this way, the difference between the quadrature-axis inductance and the direct-axis inductance can be increased, to increase the reluctance torque and improve the torque output capability of the motor 60.

Figure 8:
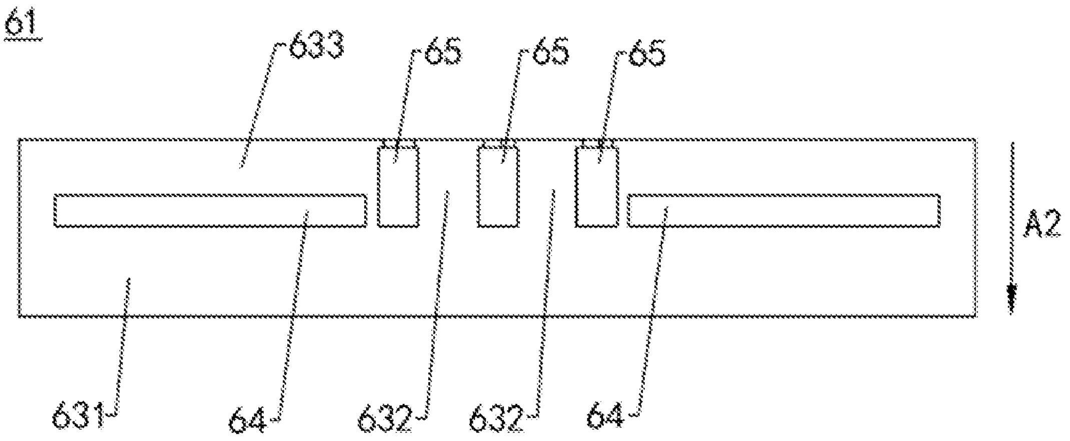
FIG. 8 is a schematic diagram of a structure of a motor rotor according to an embodiment of this application.

Refer to FIG. 5. There may be one spoke plate 632 between two adjacent permanent magnets 64. Refer to FIG. 8. There may be two spoke plates 632 between adjacent permanent magnets 64. In another implementation, there may be three, four, or another quantity of spoke plates 632 between adjacent permanent magnets 64. At least two spoke plates 632 are spaced apart in the circumferential direction A1. There may be air (that is, no other structure is placed between adjacent spoke plates) or the first permanent magnet 65 between adjacent spoke plates 632 between two adjacent permanent magnets 64. As a quantity of spoke plates 632 increases, an amount of air or a quantity of first permanent magnets 65 also increases. An increase of the quantity of first permanent magnets 65 may enhance flux concentration effects and increase the torque of the motor. In addition, an increase of the amount of air or the quantity of first permanent magnets 65 can reduce the direct-axis inductance and increase the difference between the quadrature-axis inductance and the direct-axis inductance, to increase the reluctance torque and improve the torque output capability of the motor 60. As the quantity of spoke plates 632 between adjacent permanent magnets 64 increases, at least two spoke plates 632 are disposed at intervals between adjacent permanent magnets 64, so that the quadrature-axis inductance may be effectively increased, the reluctance torque may be increased, and the torque output capability of the motor 60 may be improved.

Figure 9:
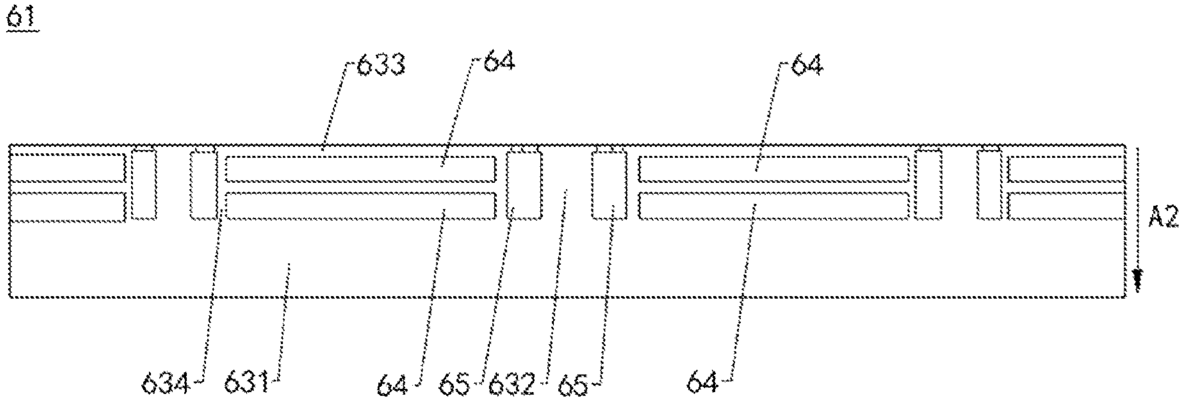
FIG. 9 is a schematic diagram of a structure of another motor rotor according to an embodiment of this application.

FIG. 9 is a schematic diagram of a structure of the motor rotor 61. In the axial direction A2, the at least two permanent magnets 64 are disposed at intervals in a stacked manner. As the quantity of permanent magnets 64 in the axial direction A2 increases, the direct-axis inductance may be reduced, and the difference between the quadrature-axis inductance and the direct-axis inductance may be increased, so that the reluctance torque is increased, and the torque output capability of the motor 60 is improved.

Figure 10:
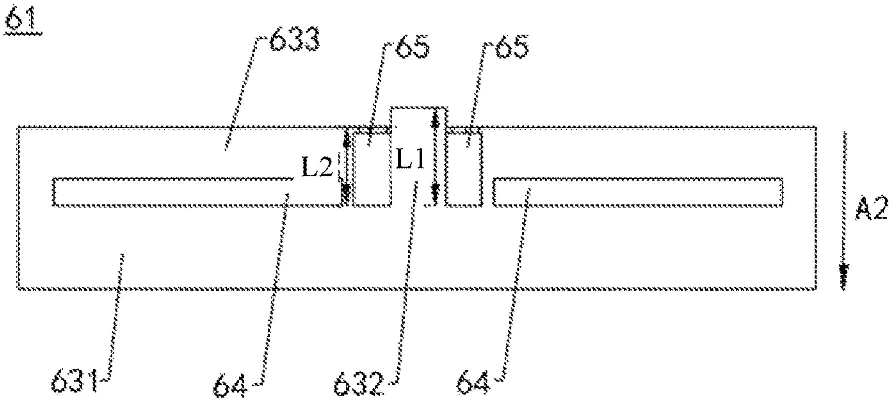
FIG. 10 is a schematic diagram of a structure of another motor rotor according to an embodiment of this application.

Refer to FIG. 10. A size L1 of the spoke plate 632 in the axial direction A2 is greater than a distance L2 between a surface that is of the iron core pole piece 633 and that is away from the permanent magnet 64 and the iron core yoke 631. In this implementation, the size L1 of the spoke plate 632 in the axial direction A2 is limited to be greater than the distance L2 between the surface that is of the iron core pole piece 633 and that is away from the permanent magnet 64 and the iron core yoke 631, so that the size of the spoke plate 632 in the axial direction A2 is enlarged. Therefore, the reluctance of the quadrature-axis magnetic circuit may be reduced, the quadrature-axis inductance may be increased, the utilization of the reluctance torque may be increased, and the torque output capability of the motor 60 may be improved. In another implementation, a size L1 of the spoke plate 632 in the axial direction A2 may be less than or equal to a distance L2 between a surface that is of the iron core pole piece 633 and that is away from the permanent magnet 64 and the iron core yoke 631.

The spoke plate 632 can limit the first permanent magnet 65 in the axial direction A2. The spoke plate 632 includes a limiting surface. The limiting surface is in contact with the first permanent magnet 65, so that the spoke plate 632 and the first permanent magnet 65 are fastened in the axial direction A2. A structure of the spoke plate 632 with the limiting surface includes but is not limited to the following three.

First: Refer to FIG. 4 and FIG. 5. The spoke plate 632 includes a main portion 6321, a limiting portion 6322, and a limiting surface 6323. The main portion 6321 is connected to the iron core yoke 631. The limiting portion 6322 is located on a side that is of the main portion 6321 and that is away from the iron core yoke 631. The limiting surface 6323 is located at the limiting portion 6322. The first permanent magnet 65 presses against the limiting surface 6323. In other words, a size of the limiting portion 6322 is greater than that of the main portion 6321. The main portion 6321 and the limiting portion 6322 form a step structure. The limiting surface 6323 is a step surface of the step structure. The first permanent magnet 65 is located between the iron core pole piece 633 and the spoke plate 632. In this implementation, the limiting surface 6323 is disposed on the spoke plate 632, to limit the first permanent magnet 65 in the axial direction A2, so that the first permanent magnet 65 is more stable and cannot move in the axial direction A2. Therefore, overall stability of the motor 60 is improved. Correspondingly, a limiting surface 6333 is disposed on a side that is of the iron core pole piece 633 and that is close to the spoke plate 632. The limiting surface 6333 on the iron core pole piece 633 and the limiting surface 6323 on the spoke plate 632 jointly limit the first permanent magnet 65 in the axial direction A2, so that the first permanent magnet 65 is more stable.

Figure 11:
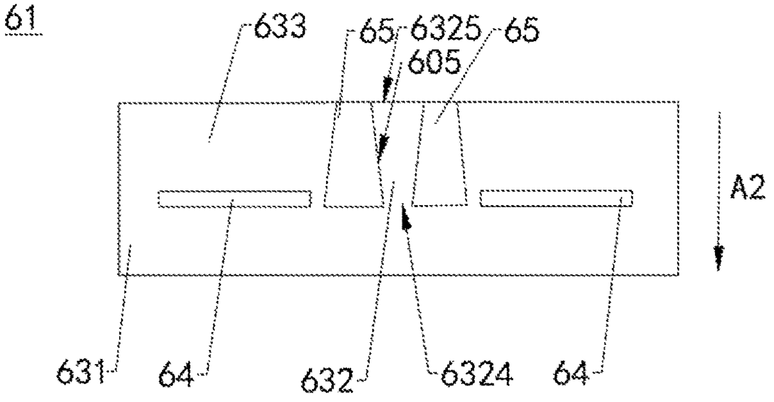
FIG. 11 is a schematic diagram of a structure of an iron core of another motor rotor according to an embodiment of this application.

Second: Refer to FIG. 11. The spoke plate 632 includes a first end 6324 and a second end 6325 that are disposed opposite to each other, and a connection surface 605 located between the first end 6324 and the second end 6325. The first end 6324 is connected to the iron core yoke 631. A size of the spoke plate 632 gradually increases from the first end 6324 to the second end 6325. The limiting surface of the spoke plate 632 is the connection surface 605. In other words, the spoke plate 632 of the iron core may be of an inverted trapezoidal structure. The spoke plate 632 may be in contact with the permanent magnet 64. Alternatively, the spoke plate 632 may be spaced apart from the permanent magnet 64. When the spoke plate 632 is spaced apart from the permanent magnet 64, there may be air or another structural part (for example, the first permanent magnet 65) between the spoke plate 632 and the permanent magnet 64. The size of the spoke plate 632 is limited to gradually increase from the first end 6324 to the second end 6325, so that a size of an end that is of a space formed between the permanent magnet 64, the iron core pole piece 633, and the spoke plate 632 of the iron core and that is close to the iron core yoke 631 is large, while a size of an end that is away from the iron core yoke 631 is small. In this way, when the first permanent magnet 65 is disposed between the permanent magnet 64 and the spoke plate 632, the connection surface 605 may limit the first permanent magnet 65 in the axial direction A2, so that the first permanent magnet 65 is more stable and cannot move in the axial direction A2. Therefore, the overall stability of the motor 60 is improved. It may be understood that when the spoke plate 632 of the iron core is of the inverted trapezoidal structure with a wide upper portion and a narrow lower portion, a space between the spoke plate 632 of the iron core and the iron core pole piece 633 may be of a trapezoidal structure with a narrow upper portion and a wide lower portion, that is, the first permanent magnet 65 embedded between the spoke plate 632 of the iron core and the iron core pole piece 633 may be of a trapezoidal structure with a narrow upper portion and a wide lower portion. Therefore, when the first permanent magnet 65 is embedded between the spoke plate 632 and the iron core pole piece 633, mounting difficulty is low, and simplicity in assembling and fastening and positioning precision are ensured.

Figure 12:
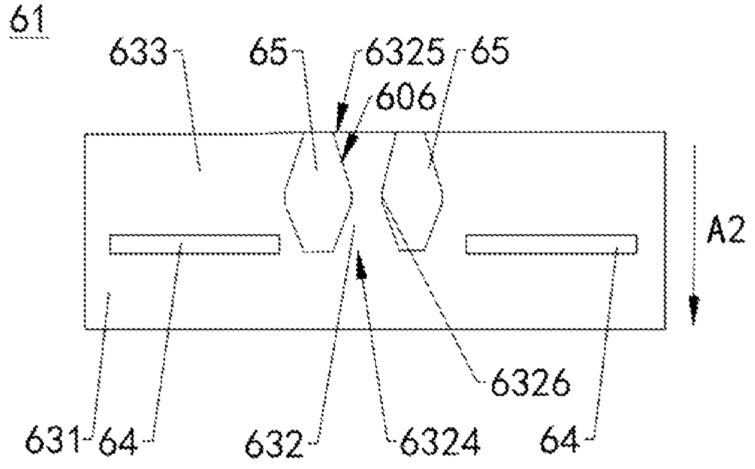
FIG. 12 is a schematic diagram of a structure of an iron core of another motor rotor according to an embodiment of this application.

Third: Refer to FIG. 12. The spoke plate 632 includes a first end 6324 and a second end 6325 that are disposed opposite to each other, and a connection portion 6326 located between the first end 6324 and the second end 6325. A connection surface 606 is disposed between the second end 6325 and the connection portion 6326. The first end 6324 is connected to the iron core yoke 631. A size from the first end 6324 to the connection portion 6326 gradually decreases. A size from the second end 6325 to the connection portion 6326 gradually decreases. The limiting surface of the spoke plate 632 is the connection surface 606 between the second end 6325 and the connection portion 6326. In other words, the spoke plate 632 may be of a dumbbell-shaped structure with two large ends and a small middle portion. When the spoke plate 632 is spaced apart from the permanent magnet 64, there may be air or the first permanent magnet 65 between the spoke plate 632 and the permanent magnet 64. The spoke plate 632 is limited as the dumbbell-shaped structure with the two large ends and the small middle portion, so that a size of an end that is of a space formed between the permanent magnet 64 and the spoke plate 632 of the iron core and that is away from the iron core yoke 631 is small. In this way, when the first permanent magnet 65 is disposed between the permanent magnet 64 and the spoke plate 632, the connection surface 606 between the second end 6325 and the connection portion 6326 may limit the first permanent magnet 65 in the axial direction A2, so that the first permanent magnet 65 is more stable and cannot move in the axial direction A2. Therefore, the overall stability of the motor 60 is improved. It may be understood that when the spoke plate 632 of the iron core is of the dumbbell-shaped structure with the two large ends and the small middle portion, a space between the spoke plate 632 of the iron core and the iron core pole piece 633 may be of a structure with two small ends and a large middle portion, that is, the first permanent magnet 65 embedded between the spoke plate 632 of the iron core and the iron core pole piece 633 may be of a structure with two small ends and a large middle portion.

A structural relationship between the first permanent magnet 65 and the spoke plate 632 in this application is not limited to that two first permanent magnets 65 are distributed at an interval on two opposite sides of the spoke plate 632, as shown in FIG. 5. The structural relationship between the first permanent magnet 65 and the spoke plate 632 further includes but is not limited to the following three implementations.

Figure 13:
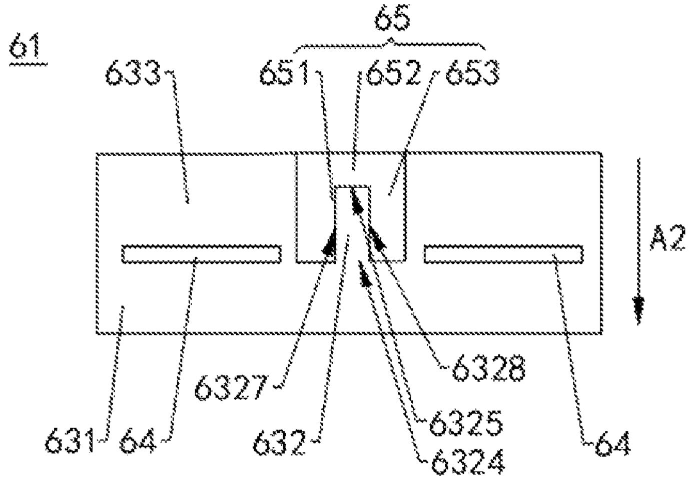
FIG. 13 is a schematic diagram of a structure of another motor rotor according to an embodiment of this application.

In a first implementation, as shown in FIG. 13, the first permanent magnet 65 includes a first magnetic portion 651, a second magnetic portion 652, and a third magnetic portion 653 that are sequentially connected. The first magnetic portion 651, the second magnetic portion 652, and the third magnetic portion 653 jointly form a first permanent magnet 65 of a U-shaped structure. The spoke plate 632 includes a first end 6324 and a second end 6325 that are disposed opposite to each other, and a first side portion 6327 and a second side portion 6328 that are located between the first end 6324 and the second end 6325 and that are disposed opposite to each other. The first end 6324 is connected to the iron core yoke 631. The second magnetic portion 652 is located on an upper side of the second end 6325. The first magnetic portion 651 is located on a side on which the first side portion 6327 is located. The third magnetic portion 653 is located on a side on which the second side portion 6328 is located. In this implementation, the first permanent magnet 65 of the U-shaped structure is fastened to the spoke plate 632 upside down. In this way, the first magnetic portion 651 and the third magnetic portion 653 on two sides of the spoke plate 632 are connected as a whole, and simplicity in mounting and positioning accuracy are ensured.

Figure 14:
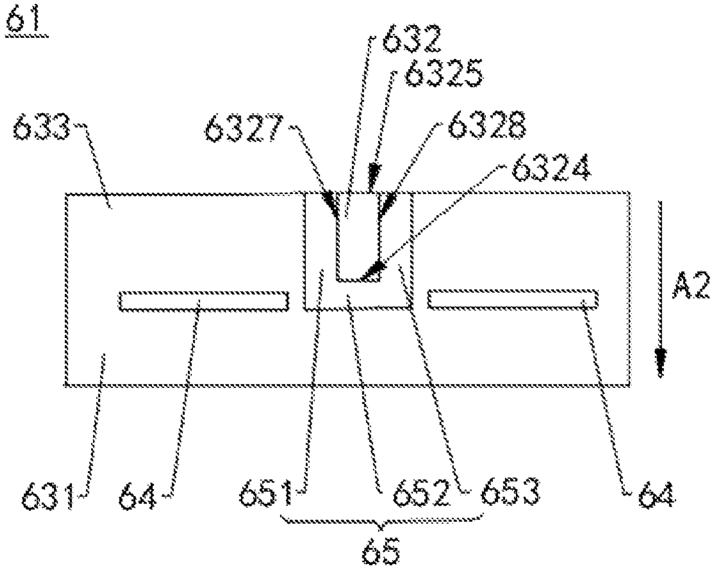
FIG. 14 is a schematic diagram of a structure of another motor rotor according to an embodiment of this application.

In a second implementation, as shown in FIG. 14, the first permanent magnet 65 includes a first magnetic portion 651, a second magnetic portion 652, and a third magnetic portion 653 that are sequentially connected. The spoke plate 632 includes a first end 6324 and a second end 6325 that are disposed opposite to each other, and a first side portion 6327 and a second side portion 6328 that are located between the first end 6324 and the second end 6325 and that are disposed opposite to each other. The iron core yoke 631, the first end 6324, and the second end 6325 are sequentially arranged in the axial direction A2. The second magnetic portion 652 is located between the first end 6324 and the iron core yoke 631. The first magnetic portion 651 is located on a side on which the first side portion 6327 is located. The third magnetic portion 653 is located on a side on which the second side portion 6328 is located. In this implementation, the first permanent magnet 65 is of a U-shaped structure, and the spoke plate 632 is located in the first permanent magnet 65 of the U-shaped structure. The spoke plate 632 can limit the first permanent magnet 65 in the axial direction A2, to prevent structural instability of the motor rotor 61 caused by a movement of the first permanent magnet 65 in the axial direction A2.

Figure 15:
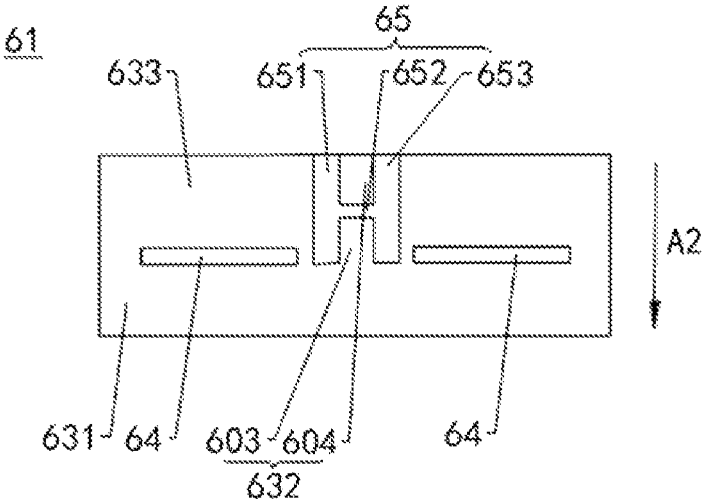
FIG. 15 is a schematic diagram of a structure of another motor rotor according to an embodiment of this application.

In a third implementation, as shown in FIG. 15, the first permanent magnet 65 includes a first magnetic portion 651, a second magnetic portion 652, and a third magnetic portion 653 that are sequentially connected. The first magnetic portion 651, the second magnetic portion 652, and the third magnetic portion 653 jointly form a first permanent magnet 65 of an H-shaped structure. The spoke plate 632 includes a first plate 603 and a second plate 604. The first plate 603 and the second plate 604 are disposed at an interval in the axial direction A2. The first plate 603 is connected to the iron core yoke 631. The second magnetic portion 652 is located between the first plate 603 and the second plate 604. The first magnetic portion 651 and the third magnetic portion 653 are located on two opposite sides of the spoke plate 632. In this implementation, the first permanent magnet 65 is of the H-shaped structure, and the second magnetic portion 652 of the first permanent magnet 65 of the H-shaped structure is located between the first plate 603 and the second plate 604. The second plate 604 can limit the first permanent magnet 65 in the axial direction A2, to prevent structural instability of the motor rotor 61 caused by a movement of the first permanent magnet 65 in the axial direction A2.

Figure 16:
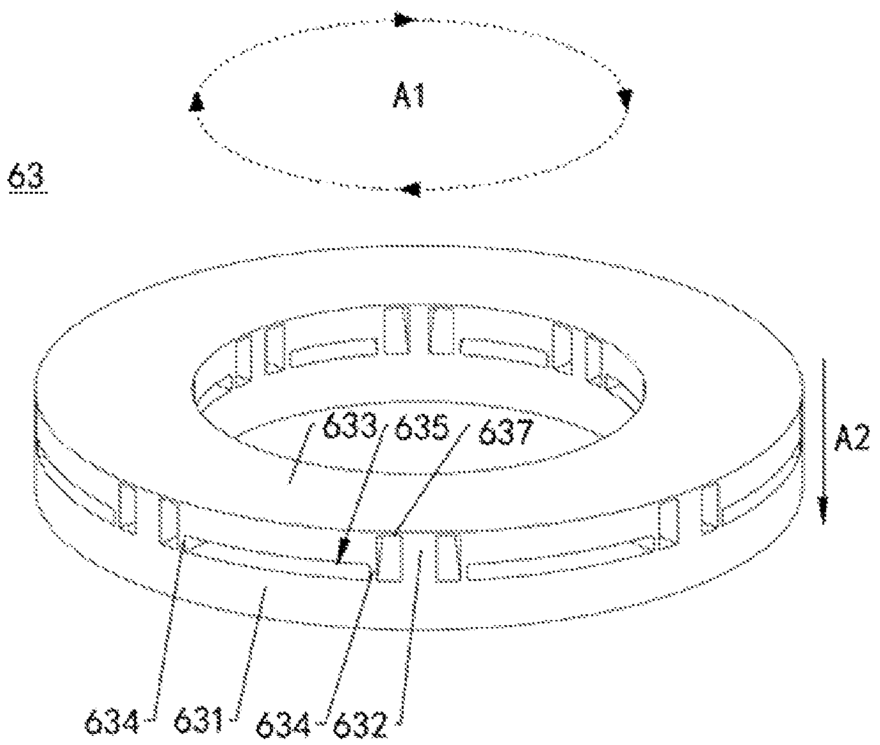
FIG. 16 is a schematic diagram of a structure of an iron core of another motor rotor according to an embodiment of this application.
Figure 17:
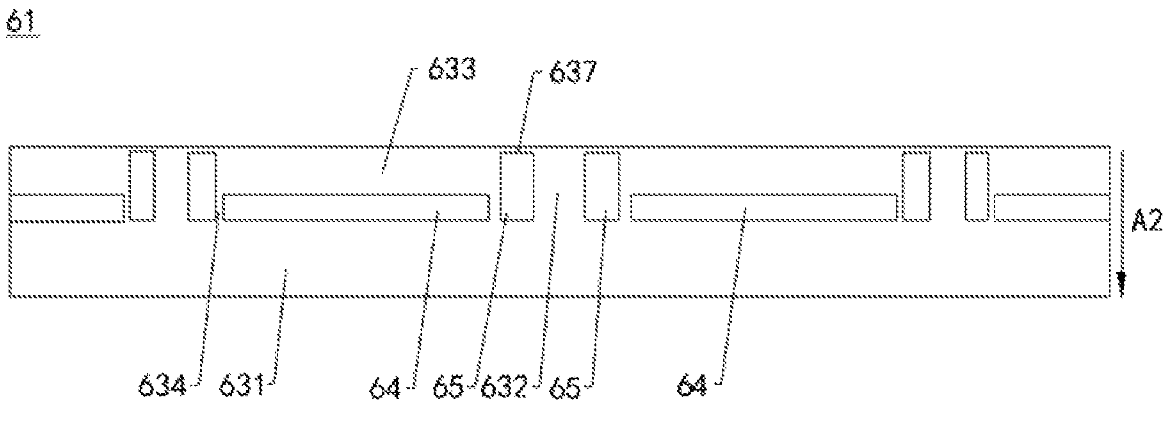
FIG. 17 is a schematic diagram of a planar structure of a motor rotor according to an embodiment of this application.

As shown in FIG. 16 and FIG. 17, FIG. 16 is a schematic diagram of another structure of the iron core 63 of the motor rotor 61, and FIG. 17 is a schematic diagram of a planar structure of the motor rotor 61. In this implementation, the iron core 63 is provided with joint portions 637. The joint portion 637 is connected to the iron core pole piece 633 and the spoke plate 632. The first permanent magnet 65 is located between the joint portion 637 and the iron core yoke 631. That is, the joint portion 637 blocks an opening between the iron core pole piece 633 and the spoke plate 632. The iron core pole piece 633 and the spoke plate 632 are on left and right sides of the first permanent magnet 65 respectively. The joint portion 637 is on an upper side of the first permanent magnet 65, while the iron core yoke 631 is on a lower side. The iron core pole piece 633 and the spoke plate 632 limit the first permanent magnet 65 in the circumferential direction A1, so that the first permanent magnet 65 cannot move in the circumferential direction A1. The joint portion 637 limits the first permanent magnet 65 in the axial direction A2, so that the first permanent magnet 65 is more stable and cannot move in the axial direction A2. Therefore, the overall stability of the motor 60 is improved.

In this implementation, the joint portion 637 is connected to the iron core pole piece 633 and the spoke plate 632, so that the iron core yoke 631, the spoke plate 632, the iron core pole piece 633, and the joint portion 637 may be of an integrated structure. Therefore, structural strength and stability of the iron core 63 are high. It may be understood that in this implementation, the integrated structure of the iron core 63 may also be implemented without disposing the flux barrier 634, and the accommodating cavity 635 can be reserved for the permanent magnet 64, to help reduce a weight of the motor 60 and reduce costs. In this application, the iron core 63 may be manufactured in a manner of winding stamping, casting machining, or integrated die casting.

It may be understood that in this application, the accommodating cavity 635 and an accommodating space between the spoke plate 632 of the iron core and the iron core pole piece 633 are reserved on the iron core 63. In this way, during assembly, the permanent magnet 64, the first permanent magnet 65, and the iron core 63 may be assembled only by embedding the permanent magnet 64 in the accommodating cavity 635 and embedding the first permanent magnet 65 in the accommodating space between the spoke plate 632 of the iron core and the iron core pole piece 633, so that mounting difficulty is low, and mounting efficiency is high.

According to this application, the quadrature-axis magnetic circuit is reserved between adjacent permanent magnets 64, and the spoke plate 632 whose reluctance is less than that of air or the permanent magnet material is disposed on the quadrature-axis magnetic circuit, that is, the spoke plate 632 is disposed between the adjacent permanent magnets 64. In this way, the reluctance of the quadrature-axis magnetic circuit may be reduced, and the quadrature-axis inductance may be increased. Therefore, the reluctance torque is increased, and the torque output capability of the motor 60 is improved. The torque of the motor includes the reluctance torque and the permanent magnet torque. It may be understood that when the required torque of the motor is constant, increasing the reluctance torque may correspondingly reduce the permanent magnet torque. In this way, the quantity of permanent magnets 64 may be reduced, which is conducive to reduction of the costs. In this application, the combination of the permanent magnet 64 and the first permanent magnet 65 that are magnetized in different directions is used. The permanent magnet 64 is magnetized in the axial direction A2, and two adjacent permanent magnets 64 are magnetized in opposite directions. The first permanent magnet 65 is magnetized in the circumferential direction A1, and at least two first permanent magnets 65 between two adjacent permanent magnets 64 are magnetized in a same direction. A combination of different magnetization directions may effectively improve the flux concentration effects of the motor rotor 61, improve the air gap density, and reduce the eddy current losses of the permanent magnet 64 and the first permanent magnet 65. According to this application, the permanent magnet 64 may be disposed between the iron core yoke 631 and the iron core pole piece 633 to form the motor rotor 61 of the built-in structure. The motor rotor 61 of the built-in structure achieves significant saliency effect of the motor, and has an advantage of generating a high reluctance torque. In addition, disposing the permanent magnet 64 inside may fully utilize the reluctance torque generated by asymmetry of the magnetic circuit of the motor rotor 61, to improve the torque output capability of the motor 60 without increasing the quantity of permanent magnets 64.

It should be noted that a person of ordinary skill in the art may further make several improvements and modifications without departing from the principle of this application, and these improvements and modifications are also considered to be within the protection scope of this application.

What is claimed is:

1. A motor rotor, comprising:
an iron core yoke;
a spoke plate; and
at least two permanent magnets;
wherein the iron core yoke is in a disk shape, the iron core yoke comprises an axial direction and a circumferential direction, wherein the at least two permanent magnets are fastened to the iron core yoke and sequentially spaced apart in the circumferential direction, and wherein the spoke plate is located between adjacent permanent magnets; and
wherein the motor rotor further comprises a first permanent magnet, the first permanent magnet is located circumferentially between one of the at least two permanent magnets and the spoke plate, and reluctance of the spoke plate is less than that of the first permanent magnet.

2. The motor rotor according to claim 1, wherein a size of the spoke plate in the axial direction is greater than a size of the spoke plate in the circumferential direction.

3. The motor rotor according to claim 1, wherein there are at least two spoke plates between two adjacent permanent magnets, and the at least two spoke plates are spaced apart in the circumferential direction.

4. The motor rotor according to claim 1, wherein the spoke plate comprises a limiting surface, and the limiting surface is in contact with the first permanent magnet, so that the spoke plate and the first permanent magnet are fastened in the axial direction.

5. The motor rotor according to claim 4, wherein the spoke plate comprises a main portion and a limiting portion, the main portion is connected to the iron core yoke, the limiting portion is on a side that is of the main portion and that is away from the iron core yoke, and the limiting surface is located at the limiting portion.

6. The motor rotor according to claim 1, wherein the motor rotor further comprises an iron core pole piece and a joint portion, the iron core pole piece is located on a side that is of the permanent magnet and that is away from the iron core yoke, the joint portion is connected to the iron core pole piece and the spoke plate, and the first permanent magnet is located between the joint portion and the iron core yoke.

7. The motor rotor according to claim 1, wherein the at least two permanent magnets are stacked in the axial direction.

8. The motor rotor according to claim 1, wherein the motor rotor further comprises an iron core pole piece and a flux barrier, the iron core pole piece and the iron core yoke are disposed at an interval, the flux barrier is connected to the iron core pole piece and the iron core yoke, the iron core pole piece, the flux barrier, and the iron core yoke enclose an accommodating cavity, and one permanent magnet is located in the accommodating cavity.

9. The motor rotor according to claim 8, wherein a size of the spoke plate in the axial direction is greater than a distance between a surface that is of the iron core pole piece and that is away from the permanent magnet and the iron core yoke.

10. A motor, comprising:

a stator;

a rotating shaft; and a motor rotor, wherein the motor rotor comprises an iron core yoke, a spoke plate, and at least two permanent magnets, wherein the iron core yoke is in a disk shape, the iron core yoke comprises an axial direction and a circumferential direction, wherein the at least two permanent magnets are fastened to the iron core yoke and sequentially spaced apart in the circumferential direction, wherein the spoke plate is located between adjacent permanent magnets;

wherein the motor rotor further comprises a first permanent magnet, the first permanent magnet is located circumferentially between one of the at least two permanent magnets and the spoke plate, and reluctance of the spoke plate is less than that of the first permanent magnet; and wherein the motor rotor is mounted to the rotating shaft, and the stator is mounted to the rotating shaft.

11. An electric vehicle, comprising:

a transmission shaft;

wheels; and a motor, wherein the transmission shaft is connected to the motor and the wheels;

wherein the motor comprises:

a stator;

a rotating shaft; and a motor rotor, wherein the motor rotor comprises an iron core yoke, a spoke plate, and at least two permanent magnets, wherein the iron core yoke is in a disk shape, the iron core yoke comprises an axial direction and a circumferential direction, wherein the at least two permanent magnets are fastened to the iron core yoke and sequentially spaced apart in the circumferential direction, wherein the spoke plate is located between adjacent permanent magnets;

wherein the motor rotor further comprises a first permanent magnet, the first permanent magnet is located circumferentially between one of the at least two permanent magnets and the spoke plate, and reluctance of the spoke plate is less than that of the first permanent magnet; and wherein the motor rotor is mounted to the rotating shaft, and the stator is mounted to the rotating shaft.

12. The electric vehicle according to claim 11, wherein a size of the spoke plate in the axial direction is greater than a size of the spoke plate in the circumferential direction.

13. The electric vehicle according to claim 11, wherein there are at least two spoke plates between two adjacent permanent magnets, and the at least two spoke plates are spaced apart in the circumferential direction.

* * * * *